United States Patent
Bonnet

(10) Patent No.: US 10,431,871 B2
(45) Date of Patent: Oct. 1, 2019

(54) CONTACTLESS ANTENNA, SUPPORT STRUCTURE AND CORRESPONDING CONNECTOR

(71) Applicant: Ingenico Group, Paris (FR)

(72) Inventor: Eric Bonnet, Malissard (FR)

(73) Assignee: INGENICO GROUP, Paris (FR)

( * ) Notice: Subject to any disclaimer, the term of this patent is extended or adjusted under 35 U.S.C. 154(b) by 455 days.

(21) Appl. No.: 14/958,119

(22) Filed: Dec. 3, 2015

(65) Prior Publication Data

US 2016/0164164 A1 Jun. 9, 2016

(30) Foreign Application Priority Data

Dec. 3, 2014 (FR) ...................... 14 61834

(51) Int. Cl.
| | |
|---|---|
| *H01Q 1/24* | (2006.01) |
| *G06Q 20/32* | (2012.01) |
| *H01Q 1/22* | (2006.01) |
| *G07F 7/08* | (2006.01) |
| *H01Q 1/14* | (2006.01) |

(52) U.S. Cl.
CPC .......... *H01Q 1/24* (2013.01); *G06Q 20/3278* (2013.01); *G07F 7/0873* (2013.01); *H01Q 1/14* (2013.01); *H01Q 1/2216* (2013.01); *H01Q 1/243* (2013.01)

(58) Field of Classification Search
CPC .... H01Q 1/24; H01Q 1/2216; G06Q 20/3278; G06Q 20/204
See application file for complete search history.

(56) References Cited

U.S. PATENT DOCUMENTS

| | | | | |
|---|---|---|---|---|
| 4,626,862 | A * | 12/1986 | Ma .................... | H01Q 1/243 343/702 |
| 7,821,463 | B2 * | 10/2010 | Nishikido ............. | H01Q 1/243 343/702 |
| 9,092,766 | B1 * | 7/2015 | Bedier ................. | G06Q 20/204 |
| 2004/0252062 | A1 * | 12/2004 | Tracy .................... | H01Q 1/243 343/702 |
| 2005/0024270 | A1 * | 2/2005 | Zheng .................... | H01Q 1/243 343/702 |
| 2005/0024274 | A1 * | 2/2005 | Byun ................... | H01Q 1/1207 343/702 |
| 2006/0139219 | A1 * | 6/2006 | Sadamori ............. | H01Q 1/243 343/702 |

(Continued)

FOREIGN PATENT DOCUMENTS

| | | |
|---|---|---|
| EP | 1895618 A1 | 3/2008 |
| FR | 2872323 A1 | 12/2005 |

OTHER PUBLICATIONS

English Translation of the Written Opinion dated Jul. 21, 2015 for corresponding French Application No. 1461834, filed Jul. 21, 2015.

(Continued)

*Primary Examiner* — Dameon E Levi
*Assistant Examiner* — Jennifer F Hu
(74) *Attorney, Agent, or Firm* — David D. Brush; Westman, Champlin & Koehler, P.A.

(57) ABSTRACT

A structural part is provided for an internal architecture of a payment terminal. The structural part is constituted by a rigid material and includes elements, on its rim, for grasping and guiding an antenna-forming electrical cable.

11 Claims, 4 Drawing Sheets

(56) References Cited

U.S. PATENT DOCUMENTS

2010/0044444 A1\* 2/2010 Jain .................... G06K 7/10237
 235/492
2012/0193422 A1\* 8/2012 Franz ................. G08B 13/2411
 235/462.1

OTHER PUBLICATIONS

French Search Report and Written Opinion dated Jul. 21, 2015 for corresponding French Application No. 1461834, filed Jul. 21, 2015.

\* cited by examiner

CONTACTLESS ANTENNA, SUPPORT STRUCTURE AND CORRESPONDING CONNECTOR

1. CROSS-REFERENCE TO RELATED APPLICATIONS

This application is claims priority from and the benefit of French Patent Application No. FR 1461834, Filed Dec. 3, 2014, the content of which is incorporated herein by reference in its entirety.

2. FIELD OF THE DISCLOSURE

The disclosure pertains to the field of payment terminals. More particularly, the disclosure pertains to the field of payment terminals that have contactless (or CLESS) payment functions.

3. PRIOR ART

With the recent development of contactless payment means such as contactless credit cards or payment cards, as well as smartphones, the newly produced payment terminals often embed systems for the contactless processing of transactions. Such contactless transaction processing systems generally comprise an antenna called a contactless antenna and a processor responsible for contactless communications (this may be a dedicated processor or a generic processor as the case may be).

The processing of contactless payments is one of the latest functions added to payment terminals (among the numerous additional functions that have been successively added to terminals in recent years). These complementary functions include especially wireless communications functions (Wi-Fi, Bluetooth), communications functions using mobile telephony networks (GPRS, UMTS), improved data entry functions (using touch screens for example). These functions have been added on in tandem with the development of technologies on the one hand and clients' demands on the other.

These numerous functions are competing with one another. To cite only wireless communications techniques, although the frequency bands used are often different, disturbances frequently occur between the different communications systems when they are activated at the same time.

For example, it is not rare for the contactless payment system to be disturbed either by untimely activation of a wireless communications system or again by the use of a touch screen or a keypad.

This problem originates in the fact that the payment terminal is light and compact. This means that the different communications functions embedded in the terminal are situated at very close distance from one another. The designers of terminals are trying to find solutions to overcome the problems encountered.

Thus, for contactless communications system, there is need for an antenna that can transmit a signal to the contactless communications means and pick up data that is sent from these contactless payment means. Hitherto, this antenna was mostly placed around the screen because naturally, when the user wishes to make payment using his contactless card or his smartphone, he brings it close to the screen. Thus, the designers of payment terminals have felt that the antenna needed for contactless payment (the contactless antenna) should be placed before or should be in proximity to the place where the user presents his payment means. In addition, it must be understood that the mounting of a payment terminal is a complex operation carried out partly by hand and that the designers of terminals must take account of this aspect of things when they design a novel terminal. The adjoining of a contactless antenna, which must necessarily be situated close to the external surface of the terminal (so that the radiation of the antenna is efficient), has therefore been done in the simplest possible way in terms of both assembly and positioning.

To this end, the contactless antenna is made in the form of a flexible printed circuit that goes around the screen. This method of designing the contactless antenna is advantageous from a certain point of view. Indeed, the mounting of this antenna is extremely simple. It is enough to place the antenna around the screen and connect the flexible element to a connector preliminarily soldered to the motherboard of the terminal (FPC connector).

This method of designing the contactless antenna however raises an economic problem. Indeed, the flexible printed circuits are invoiced at the time of their manufacture on the basis of the total surface area occupied by the flexible printed circuit. In other words, since the contactless antenna goes all around the screen, a substantial part of the surface area of this flexible printed circuit (the center which is vacant) is invoiced even though it is not used. It can easily be understood that when a screen has a size for example of 12 $cm^2$, the fact of having to pay for 12 $cm^2$ of flexible element whereas only a tiny part of this surface area is actually used to make the terminal raises an appreciable problem in terms of costs of the terminal.

Besides, this positioning of the flexible printed circuit around the screen also raises a problem in terms of interference. Indeed, the touch screens used for payment terminals have the special feature of incorporating a metal sheath aimed at enabling the screen to withstand electrostatic discharges. Now this metal sheath produces high interference in the antenna when this antenna is in use.

The existing location of the contactless antenna is therefore unsatisfactory. There is therefore a need for a solution which makes it possible to have a contactless antenna that costs less than a classic contactless antenna based on a flexible printed circuit, and is more efficient in terms of the sending and receiving of signals so as to offer the user a more satisfactory purchasing experience.

4. SUMMARY

The present disclosure, in at least certain of its embodiments, does not have these drawbacks of the prior art. The effect of the present disclosure relates to a contactless antenna which, firstly, is a low-cost antenna in its manufacturing and secondly averts the known problems of interference in prior-art terminals.

Thus, according to a first aspect, the disclosure discloses a structural part of an internal architecture of a payment terminal, said structural part being constituted by a rigid material. According to the disclosure, said internal structural part comprises means, on its rim, for grasping and guiding an antenna-forming electrical cable.

Thus, it is possible to mount and guide an electrical cable around the structural part by using the external surface of this part.

According to one particular characteristic, said means for grasping and guiding take the form of a channel.

Thus, the electrical cable can take a predetermined place within the channel.

According to one particular characteristic, the width of said channel is variable.

Thus, the winding of the cable can be done in only one way.

According to one particular characteristic, said structural part furthermore comprises a hole for inserting said electrical cable.

Thus, the cable is held in position before it is wound.

According to one particular characteristic, said structural part furthermore comprises an outlet trough for the guiding cable.

According to one particular characteristic, said structural part is to be placed above an area for receiving a screen of said payment terminal.

Thus, the antenna-forming cable is less subject to electromagnetic disturbances.

According to another aspect, the disclosure also relates to a payment terminal. Such a terminal comprises:
- a structural part as described here above;
- a single-strand cable forming three turns on the rim of said structural part;
- two embossed metal connectors, soldered to a motherboard of said payment terminal, within which the two ends of said single-strand cable are inserted.

The present disclosure also pertains to two embossed metal connectors, soldered to a motherboard of said payment terminal, within which the two ends of said single-strand cable are inserted.

5. DESCRIPTION OF THE DRAWINGS

Other features and advantages of the proposed technique shall appear more clearly from the following description of a preferred embodiment given by way of a simple, illustratory and non-exhaustive example and from the appended drawings, of which:

6. EMBODIMENT 6.1 Summary

The multitude of functions incorporated in a modern payment terminal requires terminal designers to find solutions to ensure that the functions can be implemented as satisfactorily as possible. Among these functions, the contactless payment function raises problems at both the operational level and the economic level.

Figure 1:
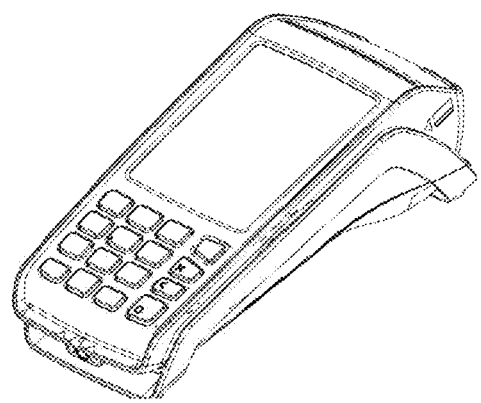
FIG. 1 illustrates a payment terminal.

The problems and issues related to the proposed technique will be understood more clearly from FIG. 1. A modern payment terminal comprises an upper half-shell and a lower half-shell. At the upper face, a certain number of elements are positioned in the apertures of the upper half-shell: the terminal thus comprises a screen, a keypad (used to carry out the operations needed to validate payment), a memory card reader (for example a smartcard reader), a second memory card reader (for example a magnetic card reader), often positioned laterally, a printer (used for example to print out receipts of purchase). In general, the smartcard reader (first memory card reader) is positioned beneath the keypad on the front face of the payment terminal. The printer for its part is positioned after the display unit, on the rear face of the terminal. The front face of the terminal often comprises an access hatch providing access to the housing and enabling the insertion of a third memory card. This third memory card can for example be a card intended for a professional. To assemble this terminal, it is necessary firstly to mount a certain number of components on electronic boards. Then, when all the components have been mounted, the different plastic parts that constitute the terminal are assembled. The joining together of the lower half-shell and the upper half-shell constitutes the final phase of the assembling of the terminal. This lower half-shell and this upper half-shell are generally screwed to an internal structure of the terminal. This internal structure, generally made of plastic, can be likened to a skeleton of the payment terminal. This internal structure is itself formed by several plastic parts which are assembled with one another.

In a first aspect, the proposed solution proposes a contactless antenna that is less expensive because of the use of a low-cost material, and especially through the use of an electrical cable. In a second aspect, the proposed technique proposes a modification of the location of the contactless antenna. The general approach of the proposed technique, in a third aspect, facilitates the connection of this contactless antenna to a motherboard of a payment terminal.

In electronic device design, one of the least costly elements is the electrical cable. It is not particularly difficult to manufacture such an electrical cable which is therefore economically advantageous. Thus, to reduce the cost price of the terminal, the inventors have had the idea of using an electrical cable to make this antenna.

The simple use of this electrical cable is of course not the main characteristic of this first aspect of the disclosure. By contrast, the fact that this electrical cable is wound three times around a support provided for this purpose on a part of the payment terminal resolves the problem of the cost of the contactless antenna and is therefore an economically advantageous solution to the problem mentioned here above.

This makes it possible to touch on the second aspect of the proposed technique which is its central aspect. As explained earlier, the mounting of a payment terminal is an operation that comprises numerous phases during which human action is required. In the prior art terminals, when a flexible printed circuit is used to form a contactless antenna, the simplest and most efficient solution in terms of the mounting of the terminal consists in providing the flexible printed circuit with an end that is placed in a connector (FPC connector). This solution makes it possible to mount the contactless antenna in a simple way.

Figure 2:
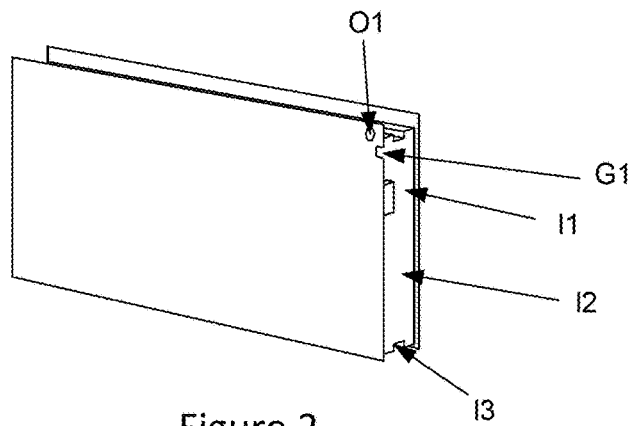
FIG. 2 is a drawing of an internal structural part of a payment terminal according to the proposed technique.
Figure 3A:
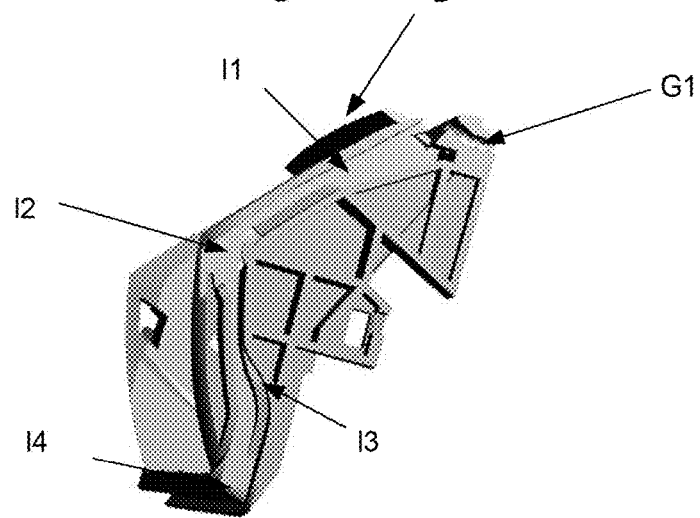
FIGS. 3a, 3b and 3c illustrate one embodiment of an internal structural part of a payment terminal according to the proposed technique.
Figure 3B:
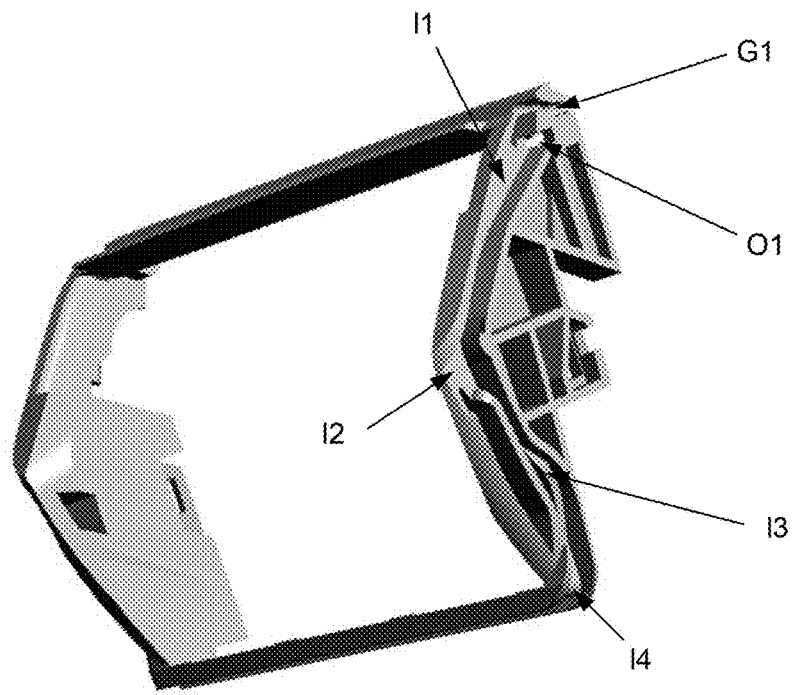
Figure 3C:
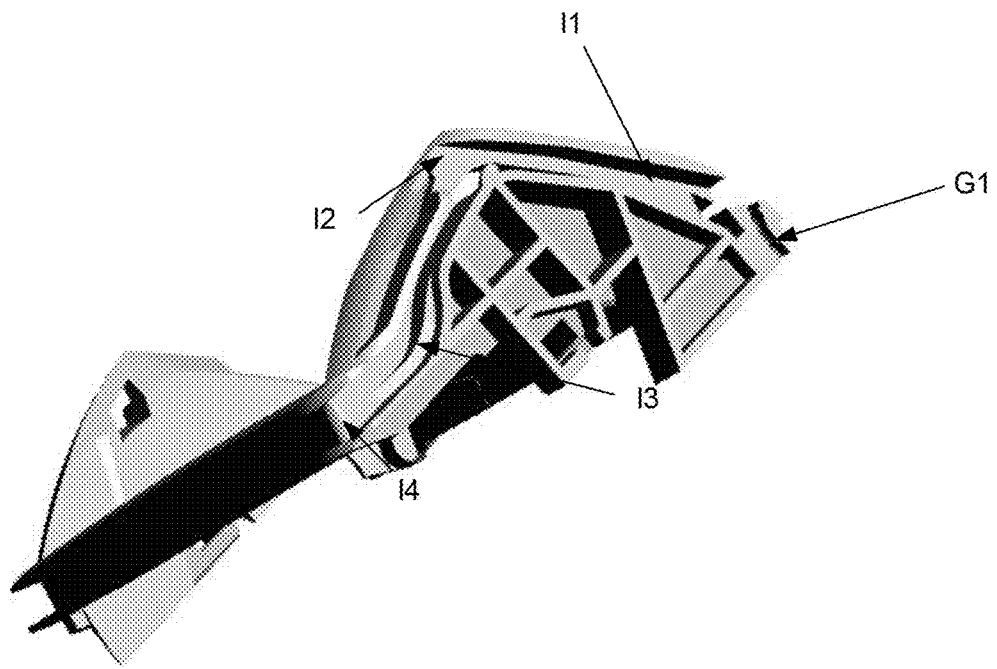

In the proposed technique, since it is no longer sought to use the flexible printed circuit, a complementary solution needs to be found to mount the antenna. The advantage of the cable is that it can be easily handled. The inventors therefore had the idea of designing a particular structural part to mount this antenna. Since the volume available in a payment terminal is relatively limited, the inventors had the idea of using a particular structural part for the contactless antenna. The principle behind this part is described with reference to FIG. 2.

This is a structural part of the internal architecture of the payment terminal that is constituted by a rigid material. This internal structural part has means on its rim for grasping and guiding the antenna-forming electrical cable. This part can have any unspecified general shape. However, owing to the specifications of the contactless standard, this part is big enough for the general surface area occupied by the antenna to comply with these standards. Besides, the rim of the part (and therefore the rim of the antenna) is sufficiently close to the external surface of the terminal when the terminal is mounted for the signals sent and received by the antenna to be of high quality.

Besides, this internal structural part has a hole (O1) for inserting the electrical cable. This insertion hole (O1) holds the cable when it is being wound in the grasping and guiding means. More particularly, the cable is first of all inserted into the hole. Once inserted, the cable is then wound around the structural part (by a number of turns needed according to the parameters of the contactless antenna). The fact that the cable has been first inserted before being wound about the part ensures the preliminary holding of the cable. Naturally, the diameter of the hole of the cable is adapted to the diameter of the cable and more particularly it is substantially identical to the diameter of the cable.

Besides, this internal structural part comprises an outlet trough (G1) for the guiding cable. This trough (G1) is used to hold the cable once the winding operation is completed and the antenna is formed. Thus, the cable no longer needs to be held and the structural part can be used to continue with the mounting of the payment terminal. In one particular embodiment, the central axis of the end of this trough is parallel to the central axis of the insertion hole. This means that when the winding of the antenna is completed, the two ends of the antenna emerge in parallel from the part. The two ends of the antenna can then be connected to the motherboard of the payment terminal according to a third aspect of the technique described which will be developed here below. In one particular embodiment, this trough and the insertion hole are appreciably close to each other so that the two ends of the antenna cable are close to each other and can be fixed at locations appreciably close to the motherboard.

Besides the means for grasping and guiding the antenna-forming cable also comprise means for powering on the electrical cable. Depending on the embodiments, these powering-on means are for example curved in the cable trough or again take the form of retaining clips.

The third aspect of the proposed technique pertains to a novel connector for the ends of the antenna-forming cable. The two ends of the cable have been described as being soldered to the motherboard. Preliminarily, the use of a flexible printed circuit requires the use of an FPC connector. In this third aspect, it is sought to facilitate the operation for fastening the two ends of the cable. To this end, the disclosure proposes a connector made of sheet metal which has the particular feature whereby it can be directly soldered to the motherboard of the payment terminal in the same way as an electronic component. This is worthwhile because this makes it possible to have a connector that is as easy to use as an FPC connector, but for a single wire.

In the embodiment described here below, the structural part is a part placed close to the printer roller of the payment terminal. This makes it possible to move the antenna as far away as possible from the areas likely to produce interference. For this embodiment, the inventors have thus had the idea of using an antenna support that forms part of the parts needed to assemble the terminal at the level of the printer.

Clearly, the embodiments presented represent only possibilities of implementation of the present technique and must not be considered to be exhaustive from the viewpoint of the scope of the proposed technique.

6.2 Description of One Embodiment of the Structural Part

This embodiment of the structural part as described here above is presented with reference to FIGS. 3a, 3b, 3c, 4. The numerical references of the previous figures have been kept. In this embodiment, the inventors have chosen to integrate the contactless antenna beyond the area of the display unit of the payment terminal in order to overcome the constraints due to the presence of any possible metal parts of the display unit, the motherboard and other antennas, especially the GPRS antenna. The antenna is situated around the paper roll of the printer (the part that is non-conductive, electrically inert and incapable of being electrically disturbed).

Thus, the structural part in this embodiment is a part serving as a support, at least partially, for a paper roll. The means for grasping and guiding the electrical cable take the form of a channel, the width of which is not constant (I #1, I #2, I #3, I #4), as can be seen in the figures. This channel is nevertheless shaped to receive three antennas turns (three turns of the electrical cable serving as an antenna). This absence of constancy in the width of the channel makes it possible to place a constraint on the way in which the electrical cable is wound on the structural part (in order to prevent any variability in the laying of the cable). Thus, at the locations where the channel is the widest, the different turns of the cable are placed in parallel. By contrast, at the locations where the cable is the narrowest, the third turn is superimposed on the other two turns. Thus, through this absence of constancy of the width in the channel, it is ensured that the cable is always wound in the same way. This meets the need for constancy of the antenna. And indeed, it is important that the antenna should be made according to a constant scheme because the working of the antenna is predetermined during the choice of electronic components and/or the programming of the processor that is mounted in the payment terminal, the aim being to tune the antenna to a communications frequency. If the antenna were to be made differently each time the terminal was manufactured, then the electronic components would have to be adjusted or modified according to each antenna. Such an adjustment of terminals, according to the antenna that has really been mounted, naturally cannot be envisaged when the terminals are manufactured in industrial-scale quantities. This means that it is essential for the antenna to be always mounted in the same sense and in the same way. The configuration of the coiling (winding) channel in this embodiment ensures that this antenna is effectively mounted always in the same way or at least that the variability of mounting of the antenna is small. In other words, this structural part enables the guidance of the positioning of the antenna wires by a series of grooves and hooks positioning the loops of antenna wires to give repeatability in the shape of the antenna and the length of its wires.

In the configuration described in the figures, the cable naturally occupies a stable position at the first loop, this first loop then serving as a support for the following loops. In other words, the part serving as a support is used to guide the positioning of the antenna wire by a series of grooves and hooks positioning the loops of wires and to give repeatability in the shape of the antenna and the length of its wires.

Besides, in this mode of regulation, the part serving as a support for the antenna cable ensures that the antenna is close to the external surface of the terminal in order to favor the sending and reception range of this antenna (which, according to the standard, must be from 0 to 4 cm).

The structural part is contained in a rectangular parallelepiped. This structural part is formed by a mixture of polyamide and fiberglass. It is a part made according to a plastic injection technique. The mixture of polyamide and fiberglass gives a highly rigid part. This is important for two reasons in this embodiment: the rigidity of this part plays a role in the general rigidity of the payment terminal; in addition, in this embodiment, this part in its upper portion has a paper-cutting blade (D), this paper-cutting blade being used to cut off the receipts printed by the printer inside the terminal. The paper is ejected from the terminal through a slot situated at a position substantially identical to that of the cutting blade. At the end of the printing of the receipt, the user of the terminal can use this blade to cut off the paper. Now, this repeated slicing operation requires the use of a relatively rigid material. It is therefore for this reason that it is necessary to have a rigid, abrasion-resistant part. Naturally, it would have been possible to add on a metallic cutting plate as a replacement for this integrated cutting blade. However, such a solution would have required the mounting of an additional part.

Besides, in this embodiment, the importance of the cable used is not negligible. More particularly, in this embodiment, the cable used is a single-strand cable with a diameter equal to 0.8 mm. The thickness of the insulating material for its part is 0.2 mm.

Figure 4:
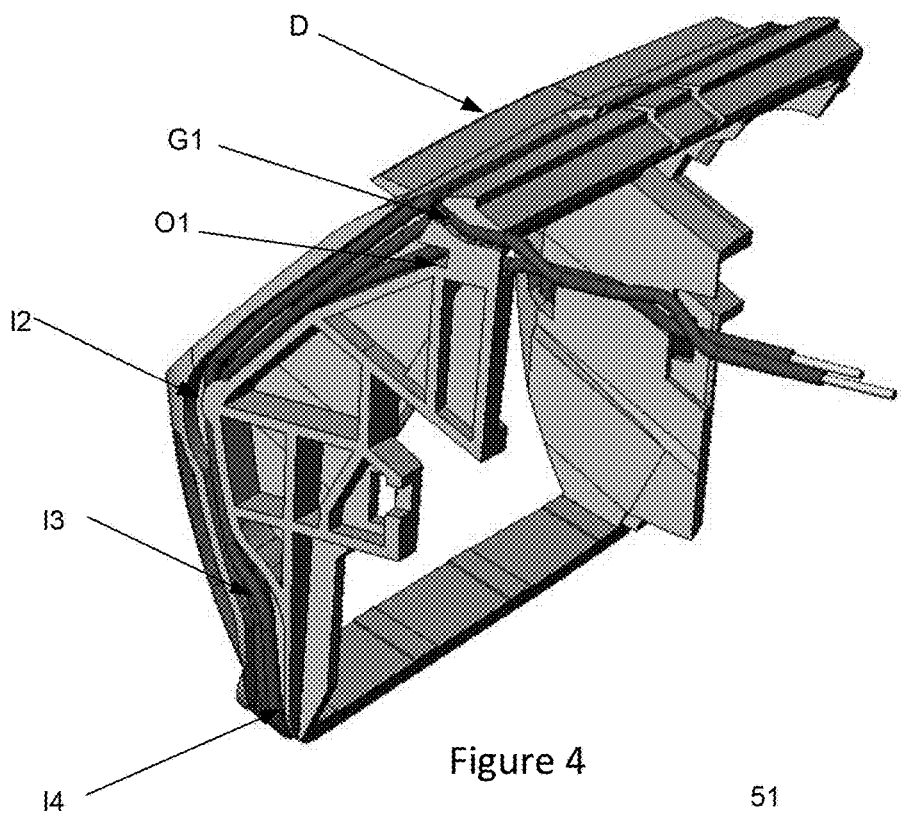
FIG. 4 illustrates one embodiment of an internal structural part of a payment terminal according to the proposed technique with an antenna-forming single-strand electrical cable.

It can also be noted that the rigidity of the part contributes to the repeatability of the geometry of the part despite the stresses due to the winding of the wire. FIG. 4 shows a part as described here above in which an electrical cable is wound to form a contactless antenna.

6.3 Description of One Embodiment of an Antenna Connector

As indicated here above, the antenna connector must be adapted to take the shape of the special configuration of the proposed antenna. More particularly, the connection of the antenna cable to the motherboard is done by specifically developed contacts. These contacts ensure electrical contact which is the first function of such a contact, ensure mechanical strength of the cable (i.e. make sure that the cable cannot be removed from the connector simply once the cable is inserted), and enable it to be soldered to the motherboard by means of a classic soldering technique.

Figure 5A:
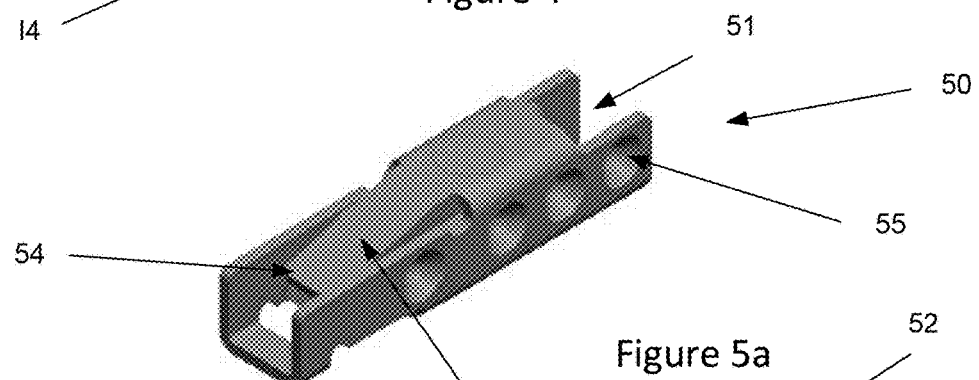
FIGS. 5a and 5b illustrate one embodiment of a connector that is to receive the ends of the antenna-forming cable.
Figure 5B:
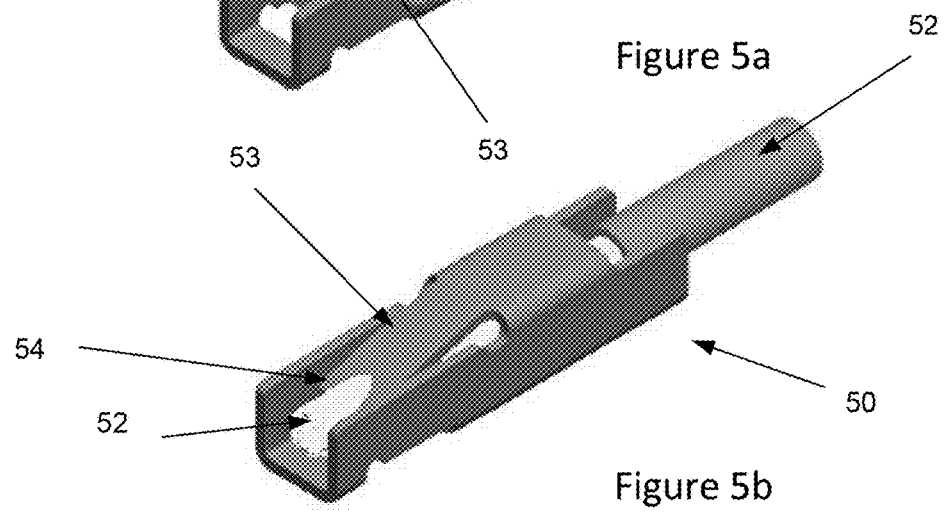
Figure 6:
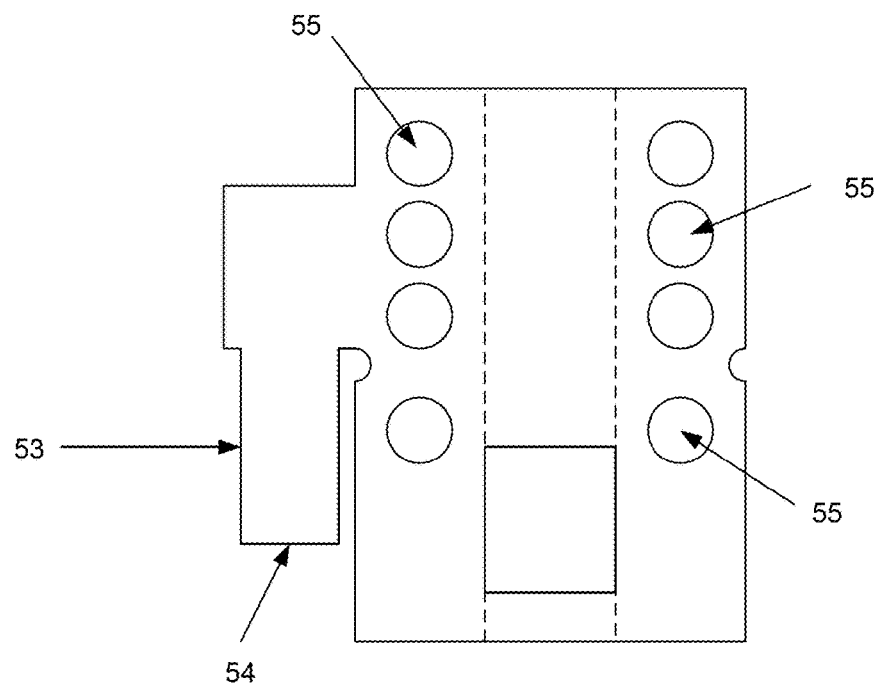
FIG. 6 is a "flat box template" type of drawing of a connector.

To this end, this embodiment proposes a connector made by folding a metal sheet. One of embodiment of this connector is described here with reference to FIGS. 5a, 5b and 6. FIGS. 5a and 5b represent an isometric view of the connector of the present technique. FIG. 6 is a "flat box template" type drawing of this connector made out of a flat metal sheet. This connector comprises an insertion portion (51) for inserting an electrical cable (52). It also comprises a retaining leg (53) for retaining the electrical cable. This retaining leg (53) for the electrical cable is tilted relative to the general plane of the connector. This retaining leg (53) is tilted towards the interior of the connector so as to rest on the electrical cable (52) when it is inserted into the connector. The angle of this insertion leg is about 15° relative to the general plane of the connector. The insertion leg comprises at its end a retaining edge (54). This retaining edge (54) is intended to retain the single-strand electrical cable that is inserted. In addition, in at least one embodiment, the connector comprises at least one lateral embossing (55). The purpose of this lateral embossing is to facilitate contact between the electrical cable and the connector. Thus, in this connector, the retaining leg (54) has the function of holding the cable while the embossed parts (55) are aimed at setting up an electrical contact between the cable and the connector. Besides, the sheath which is created by folding the metal sheet is tin-plated so that it can be soldered by reflow soldering to the electronic board. This approach has the following advantages:

compactness of the connector;
possibility of creating a fairly firm and sturdy structure (it cannot be dismantled);
low cost price.

Figure 7:
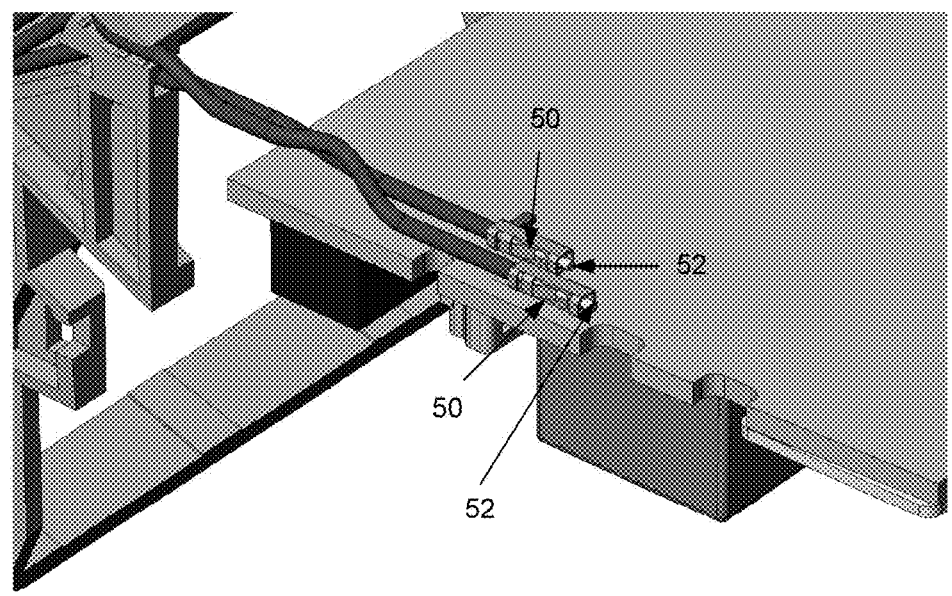
FIG. 7 illustrates connection of the antenna-forming cable with the structures described here above.

The connector of an exemplary embodiment of the disclosure is directly soldered to the motherboard of the payment terminal at locations defined as indicated in FIG. 7. This means that once the antenna is mounted on the structural part, the operator only has to plug in the cables of this antenna into the two connectors. Through the insertion leg which has a retaining edge at its end, the holding of the cable in the contactor is ensured during the mounting operations.

Finally, the cost price of the general solution of the present technique is far smaller than the cost price of the prior-art solutions. At the same time, the present technique ensures increased reliability of the contactless antenna as compared with prior solutions.

Although the present disclosure has been described with reference to one or more examples, workers skilled in the art will recognize that changes may be made in form and detail without departing from the scope of the disclosure and/or the appended claims.

The invention claimed is:

1. A structural part of an internal architecture of a payment terminal, comprising:
   a rim, wherein said structural part is constituted by a rigid material;
   an antenna-forming electrical cable; and
   a channel on the rim, which has a variable width and grasps and guides the antenna-forming electrical cable when said antenna-forming electrical cable is wound around the rim of said structural part, wherein along a widest part of said channel at least one winding of the electrical cable is placed in parallel with at least one other winding of the electrical cable, and wherein along a narrowest part of said channel at least one winding of the electrical cable is superimposed on at least one other winding of the electrical cable.

2. The structural part according to claim 1, further comprising a hole for inserting said electrical cable.

3. The structural part according to claim 1, further comprising an outlet trough for the electrical cable.

4. The structural part according to claim 1, wherein the channel is placed horizontally above an area for receiving a screen of said payment terminal.

5. The structural part according to claim 1, wherein the width of the channel varies between opposing side walls of the channel along the rim.

6. The structural part according to claim 1, wherein the structural part forms a printer support for a paper roll.

7. A payment terminal, which comprises:
   a structural part constituted by a rigid material and comprising a rim;
   a single-strand antenna-forming cable wound a plurality of times on the rim of said structural part; and
   two embossed metal connectors, soldered to a motherboard of said payment terminal, within which the two ends of said single-strand antenna-forming cable are inserted; and
   a channel having a variable width for grasping and guiding the single-strand antenna-forming electrical cable on said rim, at least one winding of the cable being placed in parallel with at least one other winding of the cable along a widest part of said channel, and at least one winding of the cable being superimposed on at least one other winding of the cable along a narrowest part of said channel.

8. The payment terminal according to claim 7, wherein the single-strand antenna-forming cable is wound three times on the rim of said structural part.

9. The payment terminal according to claim 7, wherein the width of the channel varies between opposing side walls of the channel along the rim.

10. The payment terminal according to claim 7, wherein the structural part forms a printer support for a paper roll.

11. The payment terminal according to claim 7, wherein the payment terminal further comprises a screen, and wherein the channel is positioned away from the screen such that the single-strand antenna-forming cable forms at least one loop that circumscribes an area excluding the screen.

\* \* \* \* \*